(12) United States Patent
Cheng

(10) Patent No.: US 7,998,529 B2
(45) Date of Patent: Aug. 16, 2011

(54) METHODS FOR MAKING POLYMERIC SUBSTRATES COMPRISING A HAZE-FREE, SELF-HEALING COATING AND COATED SUBSTRATES MADE THEREBY

(75) Inventor: Shan Cheng, Sewickley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 20 days.

(21) Appl. No.: 11/870,049

(22) Filed: Oct. 10, 2007

(65) Prior Publication Data

US 2009/0098299 A1    Apr. 16, 2009

(51) Int. Cl.
B05D 3/02    (2006.01)
(52) U.S. Cl. .......................... 427/384; 427/387
(58) Field of Classification Search ................ 427/387, 427/384
See application file for complete search history.

(56) References Cited

U.S. PATENT DOCUMENTS

| | | | |
|---|---|---|---|
| 3,764,457 A | 10/1973 | Chang et al. ............... 161/183 |
| 4,041,208 A | 8/1977 | Seeger et al. ............... 428/424 |
| 4,046,729 A | 9/1977 | Scriven et al. ......... 260/29.2 TN |
| 4,160,853 A | 7/1979 | Ammons ..................... 428/425 |
| 4,232,080 A | 11/1980 | Orain et al. ............... 428/215 |
| 4,435,450 A | 3/1984 | Coleman .................. 427/385.5 |
| RE32,406 E | 4/1987 | Molari, Jr. ................. 428/412 |
| 4,657,796 A | 4/1987 | Musil et al. ................. 428/38 |
| 4,683,171 A | 7/1987 | Kuga et al. ................. 428/354 |
| 4,684,694 A | 8/1987 | Breuer et al. ............... 524/730 |
| 4,711,805 A | 12/1987 | Helmer et al. ............... 428/323 |
| 4,745,152 A | 5/1988 | Fock et al. ................. 524/718 |
| 4,784,916 A | 11/1988 | Bravet et al. ............... 428/423.1 |
| 4,824,926 A | 4/1989 | O'Dwyer et al. ............... 528/65 |
| 4,997,901 A | 3/1991 | Yamada et al. ............... 528/67 |
| 5,030,686 A | 7/1991 | Holzer et al. ............... 524/731 |
| 5,084,541 A | 1/1992 | Jacobs, III et al. ............ 528/45 |
| 5,091,214 A | 2/1992 | Muller et al. ................. 437/164 |
| 5,100,731 A | 3/1992 | Yamada et al. ............... 428/423.1 |
| 5,268,136 A | 12/1993 | Girard et al. ................. 264/216 |
| 5,277,944 A | 1/1994 | Holzer et al. ................. 428/412 |
| 5,449,558 A | 9/1995 | Hasegawa et al. ............ 428/422 |
| 5,565,243 A | 10/1996 | Mauer et al. ............... 427/407.2 |
| 5,614,322 A | 3/1997 | Musil et al. ................. 428/423.1 |
| 5,786,070 A | 7/1998 | Higuchi et al. ............... 428/220 |
| 5,790,304 A | 8/1998 | Sanders et al. ................. 359/361 |
| 5,798,409 A | 8/1998 | Ho ........................... 524/506 |
| 5,891,981 A | 4/1999 | Mauer et al. ..................... 528/45 |
| 6,258,918 B1 | 7/2001 | Ho et al. ...................... 528/66 |
| 6,403,223 B1 | 6/2002 | Albro et al. .................. 428/421 |
| 6,610,777 B1 | 8/2003 | Anderson et al. ............. 524/588 |
| 6,620,877 B2 | 9/2003 | Klanica et al. ............... 524/506 |
| 6,827,875 B2 | 12/2004 | Schelhaas et al. ........... 252/182.2 |
| 6,843,933 B2 | 1/2005 | Schelhaas et al. ........... 252/182.2 |
| 6,902,791 B2 | 6/2005 | Kawasato et al. ............. 428/141 |
| 7,087,676 B2 | 8/2006 | Mazanek et al. .............. 524/591 |
| 2002/0009599 A1* | 1/2002 | Welch et al. ............... 428/423.1 |
| 2003/0026908 A1 | 2/2003 | Lane et al. .................. 427/385.5 |
| 2003/0236360 A1 | 12/2003 | Gurtler et al. ................. 525/453 |
| 2005/0107565 A1 | 5/2005 | Thiebes et al. ................. 528/44 |
| 2005/0164008 A1 | 7/2005 | Rukavina ..................... 428/412 |
| 2006/0116501 A1 | 6/2006 | Mager et al. .................... 528/44 |
| 2007/0142602 A1* | 6/2007 | Rukavina ........................ 528/44 |
| 2009/0062453 A1* | 3/2009 | Foringer et al. ............... 524/500 |

FOREIGN PATENT DOCUMENTS

JP    2007 112986 A    5/2007
WO    WO 03/091349 A1    11/2003

OTHER PUBLICATIONS

Douglas A. Wicks et al., "Blocked Isocyanates III: Part A. Mechanisms and Chemistry", Progress in Organic Coatings 36 (1999), pp. 148-172.

Douglas A. Wicks et al., "Blocked Isocyanates III Part B: Uses and Applications of Blocked Isocyanates", Progress in Organic Coatings 41 (2001), pp. 1-83.

* cited by examiner

Primary Examiner — Dah-Wei D Yuan
Assistant Examiner — Robert S Walters, Jr.
(74) Attorney, Agent, or Firm — Donald R. Palladino

(57) ABSTRACT

Disclosed are methods for making polymeric substrates, such as polycarbonate substrates, at least partially coated with a haze-free, self-healing coating. Also disclosed are substrates made by such methods.

13 Claims, No Drawings

METHODS FOR MAKING POLYMERIC SUBSTRATES COMPRISING A HAZE-FREE, SELF-HEALING COATING AND COATED SUBSTRATES MADE THEREBY

FIELD OF THE INVENTION

The present invention relates to methods for making polymeric substrates, such as polycarbonate substrates, at least partially coated with a haze-free, self-healing coating. The present invention also relates to substrates made by such methods.

BACKGROUND INFORMATION

Plastic substrates, such as polycarbonates, are used in a wide variety of applications. Unfortunately, such substrates are often particularly susceptible to environmental damage, such as scratching, as a result of impact with projectiles and other articles. As a result, to protect the substrate from such damage, the substrate may be coated with a clear and optically transparent "self-healing" coating that comprises a flexible polyurethane material. These coatings are often described as "self-healing" coatings because of their ability to return to their original shape or appearance after being deformed.

Generally speaking, polyurethanes are produced by reacting an isocyanate, a compound with functional groups of the type —NCO, with a hydroxyl, —OH, functional material. To produce storage stable one component compositions that form a polyurethane, blocking agents for temporary protection of isocyanate groups are often used. The reversible blocking of the —NCO groups allows the preparation of one-pack compositions containing a blocked polyisocyanate and, for example, a polyol, which can be cured to form a polyurethane by, for example, thermal treatment.

As will be appreciated, however, during thermal cure, the blocking agent is released and may, to a certain extent, remain in the coating. Historically, polycarbonate substrates have been susceptible to chemical attack by these blocking agents, particularly when the coating is applied film thicknesses of at least 1 mil (25.4 microns), in some cases 1 to 5 (25.4 to 127 microns) or 2 to 5 mils (50.8 to 127 microns), which are often required to form a "self-healing" coating. This chemical attack causes a haze in the resulting coating. In addition, as will be appreciated, plastic substrates, such as polycarbonates, are not able to withstand extremely high temperatures. As a result, when coating such substrates, it is important that the blocking agent deblock at a relatively low temperature.

As a result, it is desirable to provide methods for making plastic substrates, such as polycarbonate substrates, at least partially coated with a haze-free, self-healing coating.

SUMMARY OF THE INVENTION

In certain respects, the present invention is directed to methods for making polymeric substrates at least partially coated with a haze-free, self healing coating. These methods comprise: (a) depositing upon at least a portion of the substrate a coating composition comprising: (i) a polycarbonate comprising at least two isocyanate reactive groups per molecule; and (ii) a blocked polyisocyanate curing agent, wherein the blocking agent deblocks at a temperature no higher than 130° C.; and (b) curing the coating composition by heating the composition to a temperature at or above the temperature at which the blocking agent deblocks. These methods produce a haze-free, self-healing coating having a dry film thickness of at least 1 mil (25.4 microns). In certain embodiments of these methods, the blocked polyisocyanate curing agent comprises a tricarbamoyl triazine compound having the formula $C_3N_3(NHCOXR)_3$, wherein X is nitrogen, oxygen, sulfur, phosphorus, or carbon, and R is a lower alkyl group having 1 to 12 carbon atoms, or a mixture of lower alkyl groups having 1 to 12 carbon atoms.

In yet other respects, the present invention is directed coating compositions that comprise: (a) a polycarbonate comprising two or more isocyanate reactive groups per molecule; (b) a blocked polyisocyanate curing agent comprising a tricarbamoyl triazine compound having the formula $C_3N_3(NHCOXR)_3$, wherein X is oxygen and R is a lower alkyl group having 1 to 12 carbon atoms, or a mixture of lower alkyl groups having 1 to 12 carbon atoms; and (c) a polysiloxane comprising at least one structural unit represented by the general formula $R^1_n R^2_m SiO_{(4-n-m)/2}$, wherein each $R^1$, which may be the same or different, represents H, OH, a monovalent hydrocarbon group, or a monovalent siloxane group; each $R^2$, which may be the same or different, represents an isocyanate reactive group, wherein m and n fulfill the requirements of $0<n<4$, $0<m<4$ and $2\leq(m+n)<4$.

The present invention also related to substrates at least partially coated by such methods and by such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to methods for making polymeric substrates at least partially coated with a haze-free, self healing coating having a dry film thickness of at least 1 mil (25.4 microns).

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

As indicated, certain embodiments of the methods of the present invention produce a haze-free, self-healing, coating when applied to a polymeric substrate, such as a polycarbonate substrate, at a dry film thickness of at least 1 mil (25.4 microns). In certain embodiments, the dry film thickness is 1 to 5 mils (25.4 to 127 microns), or, in some cases 2 to 5 mils (50.8 to 127 microns). As used herein, the term "haze-free" refers to coating having a haze of no more than 1% when measured based upon ASTM Standard No. D-1003 using a Hunter Lab COLORQUEST® II Sphere spectrophotometer that is available from Hunter Associates Laboratory, Inc. of Reston, Va., wherein the haze determination is conducted using visible light with a wavelength ranging from about 410 nanometers to about 700 nanometers.

In certain embodiments, the coating is also transparent. As used herein, the term "transparent" means that the coating has a spectral transmission of at least 60%, in some cases at least 80%, at a wavelength ranging from 410 nanometers to 700 nanometers, based upon ASTM Standard No. D-1003 using a Hunter Lab COLORQUEST® II Sphere spectrophotometer that is available from Hunter Associates Laboratory, Inc.

As used herein, the term "self-healing" refers to coatings that return to their original shape or appearance after being scratched. The self-healing properties of coatings described herein can be assessed by the % haze of the coating after 500 taber cycles as described in the Examples herein. For purposes of the present invention, a haze % of less than 15% after 500 taber cycles is acceptable.

As previously indicated, the methods of the present invention comprise depositing upon at least a portion of the substrate a coating composition. In certain embodiments, such coating compositions are one-pack coating compositions. As used herein, the term "one-pack coating composition" refers to a liquid coating composition wherein the components comprising the composition are stored together in a single container, as opposed to compositions that are supplied in the form of two or more components which are mixed together shortly before use.

In the methods of the present invention, the coating composition comprises a polycarbonate comprising at least two isocyanate reactive groups per molecule. As used herein, the term "polycarbonate" refers to a compound whose molecular structure includes two or more carbonate groups,

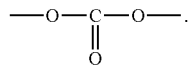

Suitable isocyanate reactive groups include, for example, hydroxyl, amino, aspartate, and/or thiol groups.

In certain embodiments, the polycarbonate comprising at least two isocyanate reactive groups per molecule comprises a polycarbonate polyol. As used herein, the term "polycarbonate polyol" refers to a polycarbonate comprising two or more hydroxyl groups, —OH, per molecule. Furthermore, in certain embodiments, the polycarbonate polyol comprises a polycarbonate diol and/or a polycarbonate triol. As used herein, the term "polycarbonate diol" refers to a polycarbonate comprising two hydroxyl groups per molecule, whereas the term "polycarbonate triol" refers to a polycarbonate comprising three hydroxyl groups per molecule. In certain embodiments, a mixture of two or more polycarbonate polyols are used. More particularly, in certain embodiments, such a mixture comprises a combination of one or more polycarbonate diols with one or more polycarbonate triols wherein, for example, the ratio of equivalents of polycarbonate diol(s) to polycarbonate triol(s) is at least 2:3, such as at least 1:1, or, in some cases, at least 3:2.

The polycarbonate diols utilized in certain embodiments of the present invention may be synthesized, for example, by the reaction of an aliphatic diol and a dialkyl carbonate, optionally in the presence of a catalyst, according to the following reaction sequence:

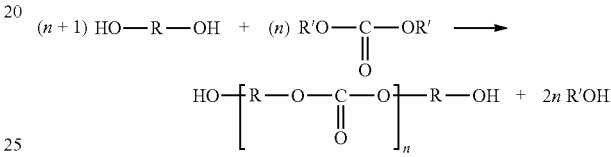

wherein n has a value of from 4 to 46; each R is independently an aliphatic group containing from 4 to 10 carbon atoms; and R' is a lower alkyl group containing 1 to 4 carbon atoms. The aliphatic diol may be linear or cycloaliphatic. Suitable aliphatic diols include, but are not limited to, alkylene diols, such as, for example, 1,6 hexanediol, 1,5-pentandediol, 1,4-butanediol, and/or 1,2 propane diol. A suitable dialkyl carbonate includes, but is not limited to, diethyl carbonate.

As indicated, a catalyst may be employed in the condensation of the aliphatic diol and dialkyl carbonate to form the polycarbonate diol. In certain embodiments, the catalyst is a titanium catalyst that is a titanium compound that is substantially free from alkali metal. Such titanium compounds include compounds having the following general formulae: (i) $TiX_4$, wherein X is a halogen, such as ether complexes of $TiX_4$; (ii) $(RR'R''R''''N)_2[Ti(OR)_6]$ and $(RR'R''R''''N)H[Ti(OR)_6]$, wherein R is any alkyl radical containing from 1 to 6 carbon atoms and need not be the same alkyl radical in every ester group, and R', R" and R''' (Referred to hereinafter collectively as R') may each be R or any aryl radical containing from 6 to 9 carbon atoms; and (iii) $Ti(OR)_4$, wherein R is any alkyl radical containing from 1 to 6 carbon atoms and need not be the same alkyl radical in every ester group; and alkyl esters of titanium which contain less than four ester groups, wherein the alkyl radicals contain from 1 to 6 carbon atoms and need not be the same alkyl radical in every ester group.

The reaction may take place under reflux conditions with the continuous elimination of R'OH. During the last stages of the reaction, the residual R'OH is removed by vacuum stripping. As shown in the above reaction scheme, a hydroxy-terminated aliphatic diol can be reacted with dialkyl carbonates, such as methyl, ethyl, n-propyl and n-butyl carbonate. In some cases, an excess of diol should be employed to insure that the polycarbonate is essentially completely hydroxy-terminated, rather than alkoxy-terminated.

The polycarbonate diols used in certain embodiments of the present invention have average molecular weights between 500 and 5000, such as between 550 and 2500, and hydroxyl numbers between 224 and 22, such as between 204 and 45. The molecular weights can be determined by hydroxyl end group analysis and by the formula:

$$\text{Average Molecular Weight} = \frac{(\text{functionality of polycarbonate diol}) (56.1) (1000)}{\text{hydroxyl number of polycarbonate diol}}$$

The hydroxyl number of the polycarbonate diol can be determined by adding pyridine and acetic anhydride to the polycarbonate diol and titrating the acetic acid formed with KOH as determined in Ind. Eng. Chem. Anal., ed. 16, 541-49 and Ind. Eng. Chem. Anal., 394 (1945). The hydroxyl number is defined as the milligrams of KOH per gram of polycarbonate diol.

As previously indicated, the coating compositions utilized in the methods of the present invention also comprise a blocked polyisocyanate curing agent that deblocks at a temperature no higher than 130° C. As used herein, when it is stated that the blocked polyisocyanate curing agent "deblocks" at a temperature no higher than 130° C., it means that the blocking agent on the polyisocyanate is selected so as to be released from the polyisocyanate at a temperature no higher than 130° C.

It has been surprisingly discovered that certain blocked polyisocyanates are particularly suitable for producing a haze-free, self-healing, transparent coatings applied to a polymeric substrate at the film thicknesses described above.

In certain embodiments, for example, the blocked polyisocyanate curing agent comprises a tricarbamoyl triazine compound having the formula $C_3N_3(NHCOXR)_3$, wherein X is nitrogen, oxygen, sulfur, phosphorus, or carbon, in some cases oxygen, and R is a lower alkyl group having 1 to 12 carbon atoms, or a mixture of lower alkyl groups having 1 to 12 carbon atoms. In certain embodiments, R has 1 to 8 carbon atoms, for example, methyl, ethyl, n-propyl, i-propyl, butyl, n-octyl, 2-ethylhexyl. In certain embodiments, R is a mixture of methyl and butyl groups. Such compounds and the preparation thereof are described in detail in U.S. Pat. No. 5,084,541, which is incorporated herein by reference. These compounds are not aminoplasts, which are condensates obtained from the reaction of an aldehyde, such as formaldehyde, such as acetaldehyde, crotonaldehyde, and benzaldehyde, with an amine or amide, such as melamine, urea, or benzoguanamine.

Other blocked polyisocyanate curing agents that deblock at a temperature no higher than 130° C., which are also believed to be suitable for use in the present invention, include polyisocyanates blocked with certain secondary amines, such as the blocked polyisocyanates described in United States Published Patent Application Publication No. 2003/0236360 at paragraphs [0015]-[0024] and [0035]-[0036], the cited portions of which being incorporated herein by reference, and certain of the blocked polyisocyanates described in U.S. Pat. No. 7,087,676 at col. 3, line 56 to col. 7, line 34, the cited portion of which being incorporated herein by reference; as well as certain phenolically blocked polyisocyanates, such as those described in United States Patent Application Publication No. 2006/0116501 at paragraphs [0019] to [0043], the cited portion of which being incorporated herein by reference.

In certain embodiments, the coating compositions utilized in the methods of the present invention comprise a mixture of blocked polyisocyanate curing agents. For example, in certain embodiments, the coating compositions of the present invention comprise a mixture of a triisocyanate, such as the tricarbamoyl triazine compound described above, and a diisocyanate, such as a blocked diisocyanate of the type described in the preceding paragraph. In certain embodiments, the equivalents ratio of triisocyanate to diisocyanate is at least 1.5:1, in some cases at least 4:1.

In certain embodiments, the blocked polyisocyanate curing agent is present in the coating composition in an amount of 10 to 70 percent by weight, such as 20 to 35 percent by weight, based on the total weight of resin solids in the coating composition.

In certain embodiments, in addition to the previously described materials, the coating compositions utilized in certain methods of the present invention also comprise a hydrophobic compound, such as, for example, certain hydrophobic organic polymers, such as a polyester polyol or, in some cases, a polysiloxane comprising at least one structural unit represented by the general formula $R^1{}_nR^2{}_mSiO_{(4-n-m)/2}$, wherein each $R^1$, which may be the same or different, represents H, OH, a monovalent hydrocarbon group, or a monovalent siloxane group; each $R^2$, which may be the same or different, represents an isocyanate reactive group, wherein m and n fulfill the requirements of $0<n<4$, $0<m<4$ and $2 \leq (m+n)<4$. In certain embodiments, the isocyanate reactive group(s), $R^2$, which may be the same or different, comprises a hydroxyl group.

As used herein, the term "monovalent hydrocarbon group" refers to a monovalent group having a backbone repeat unit based exclusively on carbon. As used herein, "monovalent" refers to a substituent group that, as a substituent group, forms only one single, covalent bond. For example, a monovalent group on the polysiloxane will form one single covalent bond to a silicon atom in the backbone of the polysiloxane polymer. As used herein, "hydrocarbon groups" are intended to encompass both branched and unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of suitable lower alkyl groups include groups having 1 to 6 carbon atoms, such as, for example, methyl, ethyl, propyl, and butyl groups. One or more of the hydrogen atoms of the hydrocarbon can be substituted with heteroatoms. As used herein, the term "heteroatoms" refers to elements other than carbon, for example, oxygen, nitrogen, and halogen atoms.

As used herein, the term "siloxane" refers to a group comprising a backbone comprising two or more —SiO— groups. For example, the siloxane groups represented by $R^1$, which is discussed above, and R, which is discussed below, can be branched or unbranched, and linear or cyclic. The siloxane groups can be substituted with pendant organic substituent groups, for example, alkyl, aryl, and alkaryl groups. The organic substituent groups can be substituted with heteroatoms, for example, oxygen, nitrogen, and halogen atoms, reactive functional groups, for example, those reactive functional groups discussed above with reference to $R^2$, and mixtures of any of the foregoing.

In certain embodiments, the polysiloxane comprises at least two reactive functional groups. In certain embodiments, the polysiloxane has a reactive group equivalent weight ranging from 50 to 1000 mg per gram of the polysiloxane. Moreover, in certain embodiments, the polysiloxane has a hydroxyl group equivalent weight ranging from 50 to 1000, such as 100 to 500, or, in some cases, 100 to 300, mg KOH per gram of the polysiloxane.

In certain embodiments, the polysiloxane has a general structure represented by the formula

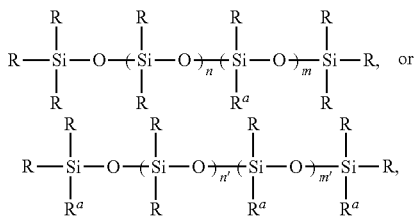

wherein: m has a value of at least 1; m' ranges from 0 to 75; n ranges from 0 to 75; n' ranges from 0 to 75; each R, which may be the same or different, is selected from H, OH, a monovalent hydrocarbon group, a monovalent siloxane group, and mixtures thereof; and —$R^a$ comprises the structure —$R^3$—X, wherein —$R^3$ is selected from an alkylene group, an oxyalkylene group, an alkylene aryl group, an alkenylene group, an oxyalkenylene group, and an alkenylene aryl group; and X represents at least one isocyanate reactive group, in some cases, two or more isocyanate reactive groups. In certain embodiments, (n+m) in the foregoing structure ranges from 2 to 9, in some cases 2 to 3. In certain embodiments, (n'+m') in the foregoing structure ranges from 2 to 9, in some cases 2 to 3.

As used herein, the term "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

As used herein, the term "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —$(CH_2)_3OCH_2C(CH_2OH)_2(CH_2CH_2—)$.

As used herein, the term "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-, -dimethylbenzyl isocyanate, such as —$(CH_2)_2C_6H_4$— and —$CH_2CH(CH_3)C_6H_3(C(CH_3)_2(NCO)$. As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

The foregoing general polysiloxane structures are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In certain embodiments, the polysiloxane is the reaction product of reactants comprising: (i) at least one polysiloxane of the formula

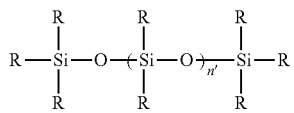

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, such as 0 to 10, or, in some cases, 0 to 5, such that the percent of SiH content of the polysiloxane ranges from 2 to 50 percent, such as 5 to 25 percent; and (ii) at least one molecule which comprises an isocyanate reactive group.

It should be appreciated that the various R groups in the polysiloxane described in the preceding paragraph can be the same or different, and, in certain embodiments, the R groups will be entirely monovalent hydrocarbon groups or will be a mixture of different groups such as, for example, monovalent hydrocarbon groups and hydroxyl groups.

In certain embodiments, this reaction product is ungelled. As used herein, "ungelled" refers to a reaction product that is substantially free of crosslinking and has an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example, the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two, such as is commercially available from BASF Corporation as MASILWAX BASE®.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example, CARDURA E available from Shell Chemical Co., and mixtures of any of the foregoing.

The previously described substituent group X can comprise an oligomeric or polymeric urethane or urea-containing material which is terminated with isocyanate reactive groups. When the substituent group X comprises such a material, the polysiloxane can be the reaction product of one or more polysiloxane polyols as described above, one or more polyisocyanates and, optionally, one or more compounds having at least two active hydrogen atoms per molecule selected from hydroxyl groups, primary amine groups, and secondary amine groups.

Nonlimiting examples of compounds having at least two active hydrogen atoms per molecule include polyols and polyamines containing primary or secondary amine groups. Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A, and the like, or higher polyols such as trimethylolpropane, pentaerythritol and the like. Polyester polyols also can be used. These and other suitable polyols are described in U.S. Pat. No. 4,046,729 at col. 7, line 52 to col. 8, line 9; col. 8, line 29 to col. 9, line 66; and U.S. Pat. No. 3,919,315 at col. 2, line 64 to col. 3, line 33, both incorporated herein by reference.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, incorporated herein by reference.

In certain embodiments, the previously described substituent group X comprises a polymeric ester-containing group which is terminated with an isocyanate reactive group. When X is such a group, the polysiloxane can be the reaction product of one or more polysiloxane polyols as described above, one or more materials comprising at least one carboxylic acid functional group, and one or more organic polyols. Nonlimiting suitable examples of materials comprising at least one carboxylic acid functional group include carboxylic acid group-containing polymers well-known in the art, for example, carboxylic acid group-containing acrylic polymers, polyester polymers, and polyurethane polymers, such as those described in U.S. Pat. No. 4,681,811. Nonlimiting examples of suitable organic polyols include those described above.

A description of polysiloxanes which are suitable for use in the present invention can also be found in U.S. Pat. No. 6,610,777 at col. 7, line 35 to col. 16, line 29, the cited portion of which being incorporated herein by reference.

In certain embodiments, the polysiloxane and polycarbonate comprising at least two isocyanate reactive groups per molecule polyol are present in the composition utilized in certain methods of the present invention such that the ratio of equivalents of the polysiloxane to the polycarbonate is at least 1:1, in some cases at least 4:1.

If desired, the coating compositions utilized in certain embodiments of the methods of the present invention can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, fillers, organic cosolvents, catalysts, including phosphonic acids, and other customary auxiliaries.

In certain embodiments, coating compositions described herein also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions utilized in certain methods of the present invention can, if desired, be formulated with a variety of organic solvents, such as certain ketones, including methyl ethyl ketone, hydrocarbons, such as toluene and xylene, alcohols, and mixtures thereof.

In the methods of the present invention, the coating composition can be deposited by any of a variety of methods including brushing, dipping, flow and roll coating, among other methods. After application of the coating composition of the present invention to the substrate, the composition is allowed to coalesce to form a substantially continuous film on the substrate by driving solvent, i.e., organic solvent or water, out of the film by heating or an air drying period. Curing of the dried film is then accomplished by baking the film at a temperature at or above the temperature at which the curing agent deblocks, i.e., no higher than 130° C., in some cases, no more than 125°, and, in yet other cases, no more than 120° C. In certain embodiments, the film thickness will be 1 to 20 mils (25.4 to 508 microns), such as 1 to 5 mils (25.4 to 127 microns), or, in some cases, 2 to 5 mils (50.8 to 127 microns) in thickness.

Illustrating the invention are the following examples that are not to be considered as limiting the invention to their details. All parts and percentages in the examples, as well as throughout the specification, are by weight unless otherwise indicated.

Example 1

To prepare one pack coating solutions #1-#4 in Table 1, component A was heated to melt at 80° C., then component B was added into component A under agitation. The resulting mixture was heated to 80° C. for additional 10-30 minutes, and cooled to room temperature.

To prepare coated samples, MAKROLON® transparent polycarbonate plaques (Bayer AG) were wiped with 2-propanol. The coating solution was applied with number 8 drawdown bar. Coated substrates were flashed at ambient for 5 minutes and then baked at 130° C. for 45 minutes. Coated samples were cooled to room temperature. After at least 24 hours, the coated samples were visually evaluated for clarity. The dry film thickness in each case was greater than 1 mil, about 3-4 mils. Results are set forth in Table 1.

TABLE 1[1]

| | Example | | | |
|---|---|---|---|---|
| | #1 | #2 | #3 | #4 |
| Component A | | | | |
| Trimethylolpropane | 0.5 | 0.5 | 0.5 | 0.5 |
| Polycarbonatediol T4671[6] | 0.5 | 0.5 | 0.5 | 0.5 |
| Component B | | | | |
| Tris(alkoxycarbonylamino) triazine blocked isocyanate[2] | 1.0 | — | — | — |
| Blocked NCO[3] | — | 1.0 | — | — |
| Blocked NCO[4] | — | — | 1.0 | — |
| Blocked NCO[5] | — | — | — | 1.0 |
| Appearance observation | | | | |
| Appearance of coating solution | Clear | yellow | clear | yellow |
| Appearance of cured coating on polycarbonate substrate | Clear | slightly yellow, milky | milky | yellow, milky |

[1]Compositions are based on the equivalent weight of each component.
[2]From BASF Corporation.
[3]A blocked isocyanate based on DESMODUR® N3390 (from Bayer AG) blocked with methyl ethyl ketoxime with a deblocking temperature of less than 130° C.
[4]IPDI blocked with n-t-butylbenzylamine with a deblocking temperature of less than 130° C.
[5]IPDI blocked with 3-dimethylaminopropylamine with a deblocking temperature of less than 130° C.
[6]Polycarbonatediol from Asahi Kasei Corporation, Mn: 1000.

Example 2

To prepare one pack coating solutions #5-#8 in Table 2, component A was heated to melt at 80° C., then component B was added into component A under agitation. The resulting mixture was heated to 80° C. for additional 10-30 minutes, and then cooled to room temperature.

To prepare coated samples, MAKROLON® transparent polycarbonate plaques (Bayer AG) were wiped with 2-propanol. The coating solution was drawdown applied. Coated substrates were baked at 130° C. for 30 minutes and then cooled to room temperature. After at least 24 hours, the samples were evaluated for clarity, adhesion and taber abrasion resistance. The dry film thickness in each case was greater than 1 mil, about 3-4 mils. Results are listed in Table 3.

TABLE 2[1]

| | Coating example | | | |
|---|---|---|---|---|
| | #5 | #6 | #7 | #8 |
| Component A | | | | |
| Trimethylolpropane | 0.5 | 0.4 | 0.5 | 0.4 |
| Polycarbonatediol T5650J[2] | 0.5 | 0.6 | | |

TABLE 2[1]-continued

| | Coating example | | | |
|---|---|---|---|---|
| | #5 | #6 | #7 | #8 |
| Polycarbonatediol T4671[3] | — | — | 0.5 | 0.6 |
| Component B | | | | |
| Tris(alkoxycarbonylamino) triazine blocked isocyanate[4] | 1.0 | 1.0 | 1.0 | 1.0 |

[1]Compositions are based on equivalent weight of each component.
[2]Polycarbonatediol from Asahi Kasei Corporation, Mn: 800.
[3]Polycarbonatediol from Asahi Kasei Corporation, Mn: 1000.
[4]From BASF Corporation.

TABLE 3

| | Coated example | | | |
|---|---|---|---|---|
| | #5 | #6 | #7 | #8 |
| Adhesion[1] | 5 | 5 | 5 | 5 |
| Initial Haze % | 0.9 | 1.4 | 0.5 | 0.8 |
| Haze % after 500 taber cycles[2] | 12.7 | 8.8 | 7.4 | 4.0 |
| Haze % after 1000 taber cycles[2] | 20.5 | 13.6 | 11.5 | 6.1 |

[1]Adhesion: Crosshatch, Nichibon LP-24 adhesive tape. Rating scale is 0-5 (no adhesion - 100% adhesion after tape peeling).
[2]Taber Abrasion: Taber 5150 Abrader, CS-10 abrasive wheels, 500 grams of weight. Haze % was measured after 500 and 1000 taber abrasion cycles respectively. Higher haze reading indicates lower abrasion resistance.

Example 3

To prepare one pack coating solutions #9-#10 in Table 4, component A was heated to melt at 80° C., then component B was added into component A under agitation. The resulting mixture was heated to 80° C. for additional 10-30 minutes, and then cooled to room temperature.

To prepare coated samples, MAKROLON® transparent polycarbonate plaques (Bayer AG) were wiped with 2-propanol. The coating solution was applied with number 8 drawdown bar. Coated substrates were baked at 100° C. for 10 minutes and then 130° C. for 40 minutes. Coated samples were cooled to room temperature. After at least 24 hours, the samples were evaluated for clarity, adhesion and taber abrasion resistance. The dry film thickness in each case was greater than 1 mil, about 3-4 mils. Results are listed in Table 5.

TABLE 4[1]

| | Coating example | |
|---|---|---|
| | #9 | #10 |
| Component A | | |
| Polysiloxane polyol[2] | 0.3 | — |
| Polysiloxane polyol[3] | — | 0.3 |
| Polycarbonatediol 1733[4] | 0.2 | 0.2 |

TABLE 4[1]-continued

|  | Coating example | |
|---|---|---|
|  | #9 | #10 |
| Component B | | |
| Tris(alkoxycarbonylamino) triazine blocked isocyanate | 0.45 | 0.45 |

[1]Compositions are based on equivalent weight of each component.
[2]In a 3000 mL glass reaction vessel, 400 parts by weight of ethylene glycol monoallyl ether, 420 parts by weight of trimethylolpropane diallyl ether, 2.6 parts by weight of magnesium aluminosilicate, and 0.06 parts by weight of sodium acetate and 0.4 parts by weight of a solution of 5 parts by weight chloroplatinic acid hexahydrate in 63 parts by weight isopropanol were agitated with a stainless steel agitator under a nitrogen atmosphere. The reactor contents were heated to 90° C. From an addition funnel 457 parts by weight of 1,1,3,3-tetramethydisiloxane were fed drop-wise into the reactor over 2 hours. After complete addition, the temperature was increased to 80° C. until the reaction was complete. The endpoint of the reaction was determined by infrared spectrophotometry which indicated the Si—H functionality had been consumed. The product was filtered through #2 filter paper to yield a yellow liquid. The material was returned to the glass reactor and treated with 5 parts by weight of magnesium aluminosilicate and 6 parts by weight of a 35% solution of hydrogen peroxide. An aliquot of the liquid was filtered to check for color and was determined visually to be clear and colorless. The material was dried using a nitrogen sparge while holding a reaction temperature of 80° C. to remove moisture remaining from the hydrogen peroxide addition. The product was filtered through #2 filter paper under vacuum to yield a colorless liquid with a hydroxyl number of 235 and an APHA color of 5.
[3]In a 5000 mL glass reaction vessel 1165 parts by weight of propylene glycol monoallyl ether, 1074 parts by weight of trimethylolpropane diallyl ether and 0.17 parts by weight of sodium acetate and 1.5 parts by weight of a solution of 5 parts by weight chloroplatinic acid hexahydrate in 63 parts by weight isopropanol were agitated with a stainless steel agitator under a nitrogen atmosphere. The reactor contents were heated to 90° C. From an addition funnel 1170 parts by weight of 1,1,3,3-tetramethydisiloxane were fed drop-wise into the reactor over 4 hours. After complete addition the temperature was increased to 100° C. until the reaction was complete. The endpoint of the reaction was determined by infrared spectrophotometry which indicated the Si—H functionality had been consumed. The product was filtered through #2 filter paper to yield a yellow liquid. The material was returned to the glass reactor and treated with 69 parts by weight of magnesium aluminosilicate and 17 parts by weight of a 35% solution of hydrogen peroxide. An aliquot of the liquid was filtered to check for color and was determined visually to be clear and colorless. The material was dried using a nitrogen sparge while holding a reaction temperature of 80° C. to remove moisture remaining from the hydrogen peroxide addition. The product was filtered through #2 filter paper under vacuum to yield a colorless liquid with a hydroxyl number of 211 and an APHA color of 0.
[4]From Stahl (USA) Inc.

TABLE 5

|  | Coated example | |
|---|---|---|
|  | #9 | #10 |
| Adhesion[1] | 5 | 5 |
| Initial Haze % | 2.0 | 2.6 |
| Haze % after 500 taber cycles[2] | 5.7 | 7.2 |
| Haze % after 1000 taber cycles[2] | 7.2 | 12.2 |

[1]Adhesion: Crosshatch, Nichibon LP-24 adhesive tape. Rating scale is 0-5 (no adhesion - 100% adhesion after tape peeling).
[2]Taber Abrasion: Taber 5150 Abrader, CS-10 abrasive wheels, 500 grams of weight. Haze % was measured after 500 and 1000 taber abrasion cycles respectively.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

I claim:

1. A method for making a haze-free coated polymeric substrate at least partially coated with a self-healing coating, comprising:
    (a) depositing upon at least a portion of the polymeric substrate a self-healing coating composition comprising:
        (i) a polycarbonate comprising at least two isocyanate reactive groups per molecule; and
        (ii) a blocked polyisocyanate curing agent, wherein the blocking agent deblocks at a temperature no higher than 130° C., and wherein the blocked polyisocyanate curing agent comprises a tricarbamoyl triazine compound having the formula $C_3N_3(NHCOXR)_3$, wherein X is nitrogen, oxygen, sulfur, phosphorus, or carbon, and R is a lower alkyl group having 1 to 12 carbon atoms or a mixture of lower alkyl groups having 1 to 12 carbon atoms; and
    (b) curing the coating composition by heating the composition to a temperature at or above the temperature at which the blocking agent deblocks, wherein
    the method produces a haze-free coated polymeric substrate having thereon a self-healing coating having a dry film thickness of at least 1 mil.

2. The method of claim 1, wherein the substrate comprises a polycarbonate substrate.

3. The method of claim 1, wherein the polycarbonate comprises a polycarbonate polyol.

4. The method of claim 3, wherein the polycarbonate polyol comprises a polycarbonate diol.

5. The method of claim 4, wherein the polycarbonate diol has a molecular weight of from 500 to 5,000.

6. The method of claim 4, wherein the polycarbonate diol is the reaction product of reactants comprising a dialkyl carbonate and an aliphatic diol.

7. The method of claim 6, wherein the aliphatic diol comprises 1,2-propane diol, 1,6-hexane diol, or a mixture thereof.

8. The method of claim 1, wherein X is oxygen.

9. The method of claim 1, wherein R has 1 to 8 carbon atoms.

10. The method of claim 9, wherein R is methyl, butyl, or a mixture thereof.

11. The method of claim 1, wherein the coating composition further comprises:
    a polysiloxane comprising at least one structural unit represented by the general formula $R^1{}_nR^2{}_mSiO_{(4-n-m)/2}$, wherein each $R^1$, which may be the same or different, represents H, OH, a monovalent hydrocarbon group, or a monovalent siloxane group; each $R^2$, which may be the same or different, represents an isocyanate reactive group, wherein m and n fulfill the requirements of $0<n<4$, $0<m<4$ and $2 \leq (m+n)<4$.

12. The method of claim 11, wherein each $R^2$ represents a hydroxyl group.

13. The method of claim 11, wherein the polysiloxane has a structure represented by the formula

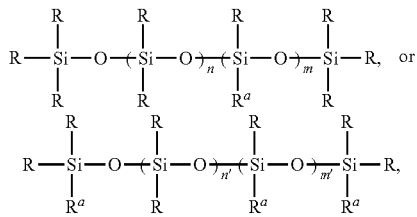

wherein:
    m has a value of at least 1;
    m' ranges from 0 to 75;
    n ranges from 0 to 75;
    n' ranges from 0 to 75;
        each R, which may be the same or different, is selected from H, OH, a monovalent hydrocarbon group, a monovalent siloxane group, and mixtures thereof; and —$R^a$ comprises the structure —$R^3$—X, wherein —$R^3$ is selected from an alkylene group, an oxyalkylene group, an alkylene aryl group, an alkenylene group, an oxyalkenylene group, and an alkenylene aryl group; and
    X represents an isocyanate reactive group.

* * * * *